(12) United States Patent
Stytsenko et al.

(10) Patent No.: US 9,218,799 B2
(45) Date of Patent: Dec. 22, 2015

(54) ACOUSTIC TRANSDUCER FOR SWATH BEAMS

(75) Inventors: Eugene Stytsenko, Lower Hutt (NZ); Andrew Bruce Heald, Wellington (NZ); Miles Owen Leonard-Taylor, Wellington (NZ); Jeremie Georges Barrel, Lower Hutt (NZ)

(73) Assignee: WASSP Limited, Auckland (NZ)

( * ) Notice: Subject to any disclaimer, the term of this patent is extended or adjusted under 35 U.S.C. 154(b) by 844 days.

(21) Appl. No.: 13/060,067

(22) PCT Filed: Jun. 23, 2009

(86) PCT No.: PCT/NZ2009/000119
§ 371 (c)(1),
(2), (4) Date: May 9, 2011

(87) PCT Pub. No.: WO2010/021554
PCT Pub. Date: Feb. 25, 2010

(65) Prior Publication Data
US 2011/0211424 A1    Sep. 1, 2011

(30) Foreign Application Priority Data

Aug. 21, 2008  (NZ) ........................................ 570725

(51) Int. Cl.
*G10K 11/00* (2006.01)
*B06B 1/00* (2006.01)
*G01S 1/72* (2006.01)
*B06B 1/06* (2006.01)

(52) U.S. Cl.
CPC ............ *G10K 11/006* (2013.01); *B06B 1/0622* (2013.01); *G01S 1/72* (2013.01)

(58) Field of Classification Search
USPC .......................................................... 367/153
See application file for complete search history.

(56) References Cited

U.S. PATENT DOCUMENTS

| 3,736,555 | A  |   | 5/1973  | Barrow |
| 4,183,249 | A  |   | 1/1980  | Anderson |
| 4,459,852 | A  |   | 7/1984  | Chubachi et al. |
| 4,766,575 | A  |   | 8/1988  | Ehrlich et al. |
| 5,122,993 | A  | * | 6/1992  | Hikita et al. ................... 367/155 |
| 5,423,220 | A  |   | 6/1995  | Finsterwald et al. |
| 5,526,325 | A  | * | 6/1996  | Sullivan et al. ............... 367/138 |
| 5,546,356 | A  | * | 8/1996  | Zehner ............................. 367/88 |
| 5,640,371 | A  |   | 6/1997  | Schmidt et al. |
| 6,537,220 | B1 |   | 3/2003  | Friemel et al. |
| 6,961,025 | B1 | * | 11/2005 | Chethik et al. ................ 343/786 |
| 8,323,201 | B2 | * | 12/2012 | Towfiq et al. ................. 600/459 |
| 8,331,197 | B2 | * | 12/2012 | Stytsenko et al. ............ 367/138 |
| 2002/0082589 | A1 |   | 6/2002 | Friedman et al. |

(Continued)

FOREIGN PATENT DOCUMENTS

JP    JP 63-305848    12/1988
JP    10-136491 A    5/1998

(Continued)

*Primary Examiner* — James Hulka
(74) *Attorney, Agent, or Firm* — Frommer Lawrence & Haug

(57) ABSTRACT

A swath beam acoustic transducer (100) for projecting and/or receiving acoustic swath beams (108). The transducer comprises an array of active acoustic elements (104) that are arranged to collectively provide an elongate concave radiation surface (106) with an associated acoustic aperture (110). The array of active acoustic elements (104) is operable to project and/or receive acoustic swath beams (108) via the radiation surface (106).

23 Claims, 6 Drawing Sheets

(56) References Cited

U.S. PATENT DOCUMENTS

2005/0096542 A1    5/2005  Weng et al.
2009/0043206 A1*   2/2009  Towfiq et al. ................. 600/447
2011/0205848 A1*   8/2011  Stytsenko et al. ............ 367/138

FOREIGN PATENT DOCUMENTS

JP      11-128225 A      5/1999
JP      2005-351718 A   12/2005

* cited by examiner

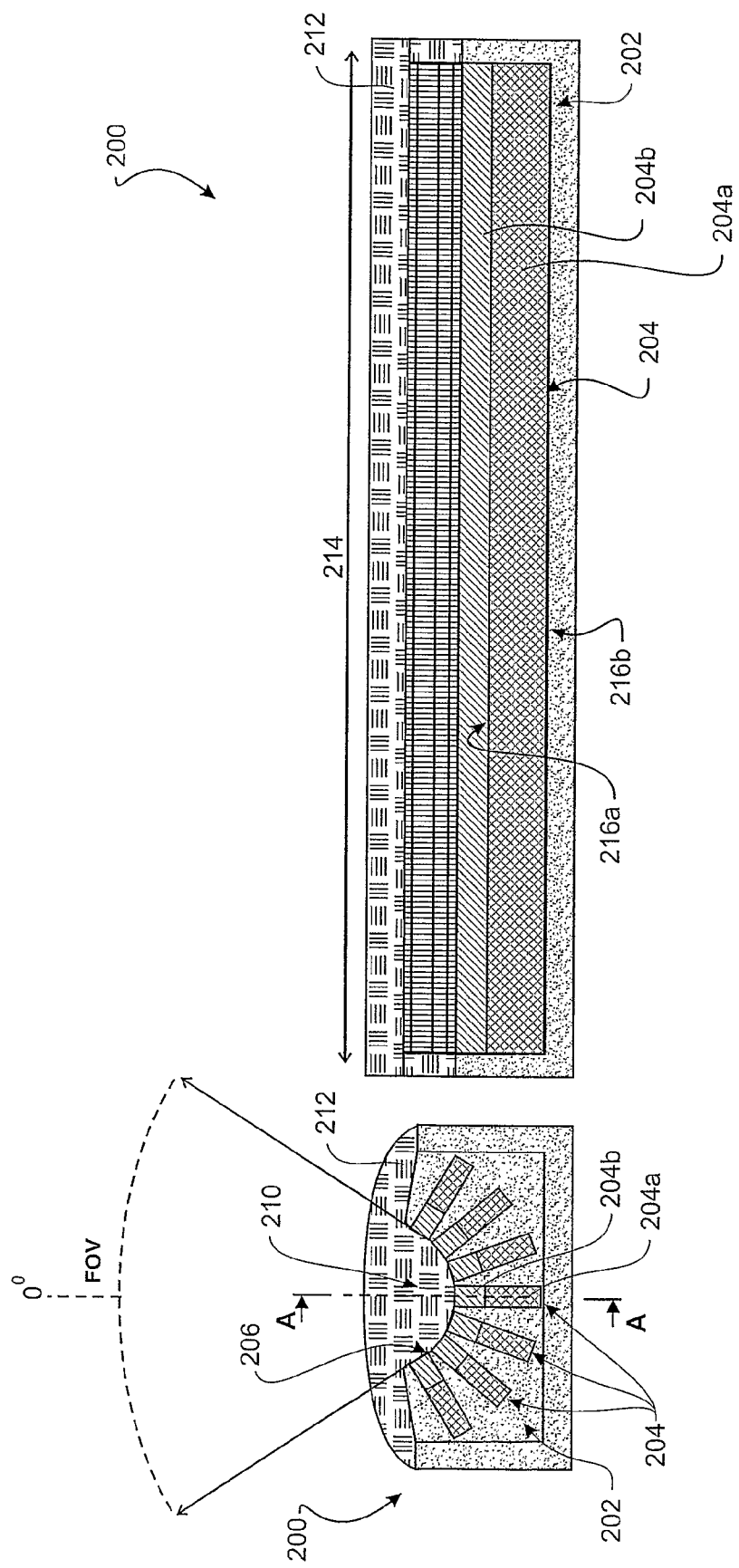

ACOUSTIC TRANSDUCER FOR SWATH BEAMS

This application is a 371 of PCT/NZ2009/000119 filed on Jun. 23, 2009, published on Feb. 25, 2010 under publication number WO 2010/021554 A and claims priority benefits of New Zealand Patent Application No. 570725 filed Aug. 21, 2008, the disclosure of which is incorporated herein by reference.

FIELD OF THE INVENTION

The present invention relates to an acoustic transducer for projecting and/or receiving acoustic swath beams.

BACKGROUND TO THE INVENTION

Acoustic beams are used in many applications, including sonar and other underwater acoustic devices, audio transducers, and acoustic control of space, for example architectural acoustics.

In sonar and underwater acoustic devices, the objective can be to map the ocean floor or to detect stationary or moving objects within the water. Additional uses for underwater acoustic devices includes fish finding and fish population estimation, inspection of underwater objects such as boat hulls, piers, and navigation. In many of these applications, it is desirable to utilise an acoustic transducer that is capable of projecting far-field acoustic swath beams. Swath beams are generally considered to be beams that cover a wide angle in one direction and a narrow width in the perpendicular direction.

Known acoustic transducers for projecting swath beams generally comprise an array of active transducer elements that are arranged as either line arrays or alternatively convex cylindrical arrays. Both of these types of acoustic transducers have limitations. For example, the line array acoustic transducers typically have beam power limitations due to their limited width.

As to the convex cylindrical array transducers, these have size constraints in that they cannot generally be made smaller than several wavelengths in diameter relative to the operating frequency due to structural requirements. For example, FIG. 1 shows a cross-sectional end view of an example of a known structure for a convex cylindrical array transducer 10 for producing swath beams. Briefly, the convex cylindrical transducer 10 comprises an array of active transducer elements 12 that are fixed in a convex cylindrical arrangement within a support structure 14. In operation, the transducer elements 12 are driven to project an overall wide-angle swath beam via acoustic aperture 16. The acoustic aperture 16 has a width defined by arrows 20. Typically, the transducer elements 12 have a thickness of about a half wave-length relative to the operating frequency, and this requires a substantial spacing 18 between the front surfaces of the elements. Therefore, the convex cylindrical transducer 10 generally needs to be at least several wavelengths in diameter to operate effectively. This is because arranging the elements 12 into a convex cylinder having a smaller diameter increases the spacing 18 between the elements and this tends to result in prohibitively large response variations within the angle of interest of the swath beam.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved acoustic transducer for projecting and/or receiving swath beams, or to at least provide the public with a useful choice.

SUMMARY OF THE INVENTION

In a first aspect, the present invention broadly consists in a swath beam acoustic transducer for projecting and/or receiving acoustic swath beams, comprising: an array of active acoustic elements that are arranged to collectively provide an elongate concave radiation surface with an associated acoustic aperture, and wherein the array of active acoustic elements are operable to project and/or receive acoustic swath beams via the radiation surface.

Preferably, the radiation surface may be a concave cylindrical radiation surface in that the radiation surface conforms substantially to the peripheral external surface of a semicylinder.

Preferably, the active acoustic elements may be arranged about the concave semicylindrical radiation surface with each element being equally spaced by a radii from the cylinder axis.

Preferably, the array of active acoustic elements may be arranged to provide a substantially continuous radiation surface.

Preferably, each active acoustic element may be an acoustic transducer element comprising active acoustic material coupled between electrodes that are electrically excitable. More preferably, each acoustic element may be provided with one or more matching layers coupled directly or indirectly to the active acoustic material, the matching layer(s) being arranged to provide an impedance matching between the transducer and acoustic medium through which the acoustic beams propagate. By way of example, each active acoustic element may comprise a matching layer situated between the radiation surface and the active acoustic material.

Preferably, the active acoustic elements may be acoustically isolated from each other within a support structure.

Preferably, the swath beam acoustic transducer may further comprise a control system that is electrically connected to each of the active acoustic elements and which is operable to generate electrical driving signals to drive each of the active acoustic elements to thereby project an overall swath beam from the radiation surface or alternatively receive and process electrical signals from the active acoustic elements that are generated in response to a swath beam received by the radiation surface.

Preferably, each active acoustic element in the array may be straight and elongate. More preferably, the length of each active acoustic element may extend substantially the entire length of the radiation surface.

In one form, the transducer may be arranged to produce a swath beam having a substantially fixed width in the direction of the longitudinal axis of the radiation surface.

In another form, each straight and elongate active acoustic element is collectively formed from a line of multiple individual active acoustic elements that are acoustically and electrically isolated from each other along the length of the transducer. Preferably, the lines of individual active acoustic elements may be aligned with respect to each other along the length of the transducer to thereby provide a series of selectively operable concave array segments of active acoustic elements along the length of the transducer. More preferably, the control system may be operable to activate or deactivate any one or more of the concave array segments of active acoustic elements to thereby control the effective length of the radiation surface and consequently the width of the propagated swath beam in the direction of the longitudinal axis of the radiation surface. Additionally or alternatively, the control system may be operable to apply differently phased driving signals to the concave array segments of active acoustic elements to thereby steer the propagated swath beam in the desired direction about an axis transverse to the longitudinal axis of the radiation surface.

Preferably, the array of active acoustic elements is operable to project acoustic swath beams having a wide field of view in the plane that is perpendicular to the longitudinal axis of the transducer and wherein the far-field acoustic intensity is substantially uniform within the field of view.

Preferably, the active acoustic elements are activated at a predetermined operating frequency and the array of active acoustic elements are arranged such that the centre-to-centre distance between adjacent acoustic elements about the radiation surface is not greater than approximately one half of the wavelength of the operating frequency.

Preferably, the radiation surface may be indirectly exposed via one or more protection layers to the acoustic medium through which the projected or received acoustic swath beams propagate. More preferably, the radiation surface forms an acoustic aperture through which acoustic swath beams are projected or received, the one or more protection layers being arranged to at least partially fill the acoustic aperture. By way of example only, the protection layer(s) may be formed from rubber that is formulated to be acoustically transparent in the water to enable the transducer to operate underwater.

In a second aspect, the present invention broadly consists in an acoustic transducer for projecting and/or receiving acoustic swath beams comprising: a concave cylindrical arrangement of operable acoustic transducer elements.

In a third aspect, the present invention broadly consists in a method of projecting acoustic swath beams comprising driving a concave cylindrical arrangement of operable acoustic transducer elements to project a swath beam.

The second and third aspects of the invention may have any one or more of the features mentioned in respect of the first aspect of the invention.

The phrase "radiation surface" as used in this specification and claims is intended to mean the collective or effective surface associated with the acoustic aperture that is formed from the array of active acoustic elements and which is the surface from which acoustic beams are projected and/or received, whether the surface is directly exposed to the acoustic medium or indirectly exposed via one or more other layers.

The phrase "swath beams" as used in this specification and claims is intended to mean far-field acoustic beams that cover a wide angle in one direction and which have a narrower or alternatively controllable width or focus in the perpendicular direction.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

The invention consists in the foregoing and also envisages constructions of which the following gives examples only.

BRIEF DESCRIPTION OF THE DRAWINGS

Preferred embodiments of the invention will be described by way of example only and with reference to the drawings, in which:

FIG. 3A shows a cross-sectional end view of a first preferred form acoustic transducer of the invention;

FIG. 3B shows a cross-sectional side view of the first preferred form acoustic transducer viewed through line AA of FIG. 3A;

DETAILED DESCRIPTION OF PREFERRED EMBODIMENTS

Overview

The invention relates to an acoustic transducer for producing and/or receiving acoustic swath beams. As referred to in this description, swath beams are typically far-field acoustic beams that cover a wide angle in one direction and which have a narrow or alternatively controllable width or focus in the perpendicular direction. Far-field in this context is generally considered to be a distance that is much greater than the size of the transducer and the wavelength of its operating frequency. The acoustic transducer can be configured to generate and receive acoustic waves at any desired operating frequency, including audible and ultrasonic frequencies for example.

Figure 2:
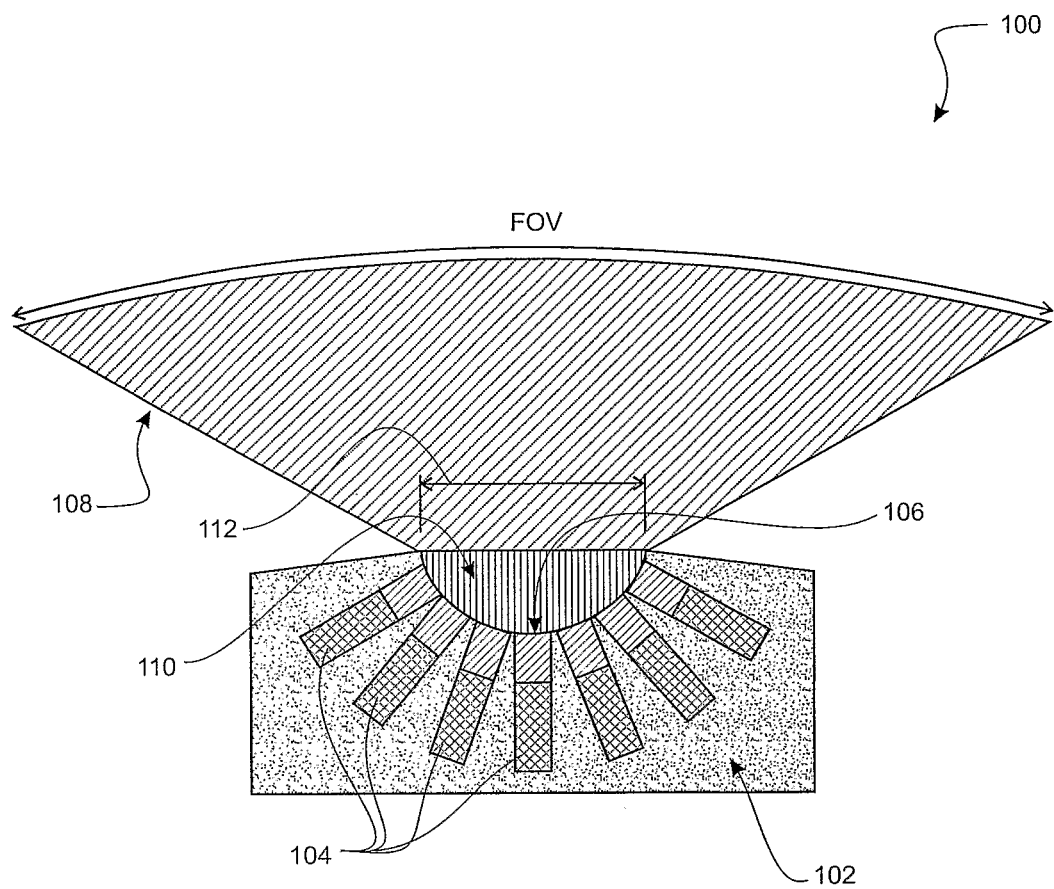
FIG. 2 shows a cross-sectional end view of an acoustic transducer in accordance with a preferred embodiment of the invention.

Referring to FIG. 2, a cross-sectional end view of the structure of the acoustic transducer 100 of the invention is shown. The view of FIG. 2 is in a plane that is perpendicular to the longitudinal axis of the transducer 100. In brief, the acoustic transducer 100 comprises an elongate support structure 102 that is arranged to support an array of active acoustic elements 104. The active acoustic elements 104 are arranged in a substantially concave pattern relative to each other to thereby provide a substantially concave elongate radiation surface 106 from which acoustic beams are projected and received by the transducer 100. More particularly, the active acoustic elements 104 are arranged to collectively provide a substantially continuous concave and elongate radiation surface 106 for the acoustic swath beams.

It will be appreciated that each of the active acoustic elements 104 may be driven to generate an acoustic beam and that the overall far-field swath beam 108 is the superposition of all the individual acoustic beams. As shown, the swath beam 108 has a wide-angle or wide field of view (FOV) in the plane that is perpendicular to the longitudinal axis of the transducer. The FOV of the transducer 100 is dependent on the size of opening of the acoustic aperture 110 formed by the acoustic active elements 104. In the preferred form, the acoustic transducer is capable of projecting a swath beam having a far-field acoustic intensity that is substantially uniform within the FOV.

As to the width of the swath beam 108 in the perpendicular direction to the FOV (or into the page along the longitudinal axis of the transducer 100), this is dependent on the length of the acoustic active elements 104 and radiation surface 106. It will be appreciated that a longer transducer 100 will produce a narrower swath beam in the direction of the longitudinal axis of the transducer 100, and vice versa in that a shorter transducer will produce a wider swath beam.

As mentioned, the acoustic transducer 100 comprises a substantially concave elongate radiation surface 106 that is provided by a concave arrangement of active acoustic elements 104. In the preferred form, the radiation surface 106 conforms substantially to a portion or segment of the peripheral external surface of a cylinder with an associated diameter, and this will be referred to as a "concave cylindrical radiation surface". In other words, the radiation surface can in some forms be considered as being semicylindrical in that the active acoustic elements conform to the external surface of a semicylinder. For example, the active acoustic elements 104 can be said to be arranged to extend radially outwardly relative to a segment of a virtual cylindrical surface with each element being equally spaced by a radii from the cylinder axis. Typically, the concave cylindrical radiation surface will extend not more than half the full circumference of the cylinder. However, it will be appreciated that the elongate concave radiation surface 106 need not necessarily conform to a semicylinder and may alternatively simply be an accurate radiation surface that is curved inward and non-cylindrical in nature.

Figure 1:
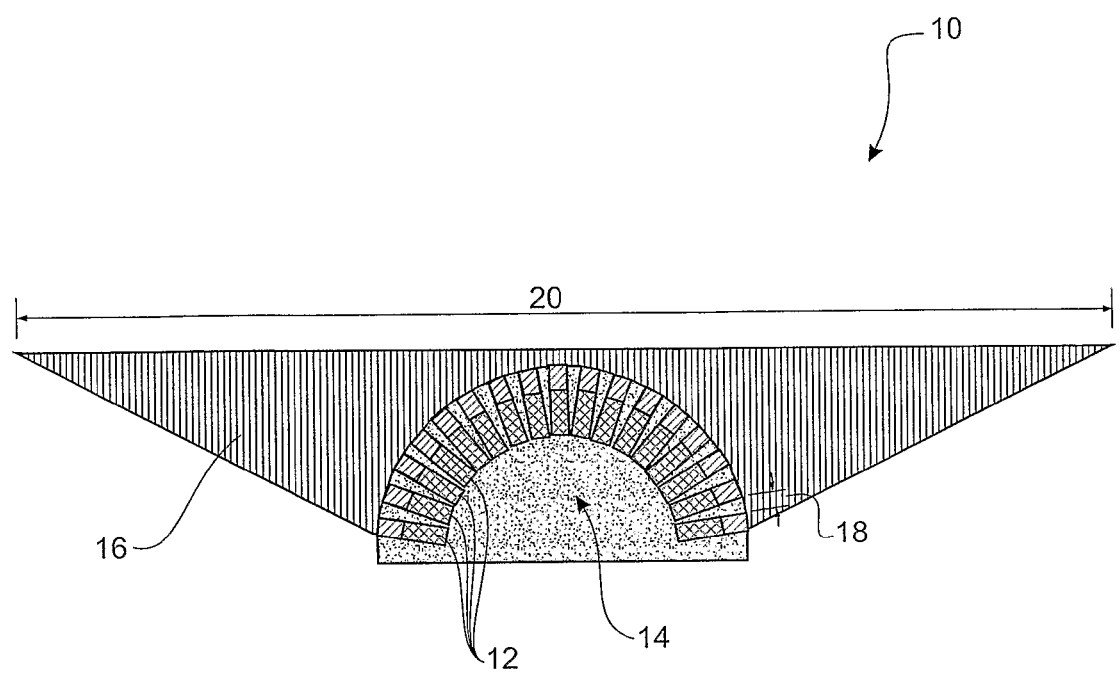
FIG. 1 shows a cross-sectional end view of an example of a conventional convex cylindrical acoustic transducer array for generating swath beams.

The concave cylindrical transducer 100 is capable of producing the same wide-angle swath beam as the known conventional convex cylindrical transducer 10 shown in FIG. 1, but with a smaller number of active acoustic elements 104 and a smaller acoustic aperture 110, having a width indicated by arrows 112. By way of example only, the known conventional convex cylindrical transducer of FIG. 1 would require a minimum size of 10-12 wavelengths of the operating frequency in diameter and a much wider aperture 20 relative to the concave cylindrical transducer 100 of FIG. 2 that can generate a swath beam having the same FOV with a concave cylindrical radiation surface size of approximately 2.5 wavelengths in diameter. Along with the general benefits of being a smaller transducer, the smaller acoustic aperture 110 allows the application of shading for side-lobe suppression and electronic beam-steering along the longitudinal or cylindrical axis of the transducer using phased-array techniques.

More preferred forms of the acoustic transducer of the invention will now be described in greater detail, by way of example only.

First Preferred Form—Single-Channel Acoustic Transducer

Referring to FIGS. 3A and 3B, a first preferred form single-channel acoustic transducer 200 will now be described. In the first preferred form, the acoustic transducer 200 comprises a support structure 202 that supports an array of multiple active acoustic elements 204 that are arranged to provide an elongate concave radiation surface 206 for protecting and/or receiving acoustic swath beams. Preferably, the active acoustic elements 204 are in a concave cylindrical arrangement so as to provide a concave cylindrical radiation surface of a predetermined diameter for a predetermined operating frequency or range of operating frequencies. The support structure may be any form of suitable known transducer array support material or mechanical system for supporting the array of active acoustic elements in place. In the first preferred form, the support structure is provided in and around the active acoustic elements 204 so as to acoustically isolate them from each other. The support structure may comprise any acoustically insulating material as will be appreciated by those skilled in the art. By way of example only, the support structure may be formed from rigid porous polymer materials.

The radiation surface 206 may either be directly exposed to the acoustic medium or indirectly exposed via one or more protection layers. It will be appreciated that the acoustic medium through which the acoustic beams propagate when being projected from the transducer or received by the transducer. If protection layer(s) are employed, these may be fixed, secured or formed across the radiation surface in various ways, depending on design requirements. It will be appreciated that mechanical or other securing methods can be used to secure the protection layer(s) to the radiation surface 206, including, but not limited to, adhesives or moulding techniques. By way of example, the cavity or acoustic aperture 210 provided by the concave elongate radiation surface 206 may optionally be at least partially filled with a protection layer 212. For example, if the transducer 200 is employed as an underwater transducer, the protection layer 212 may be formed from rubber that is formulated to be acoustically transparent in water. For underwater transmit transducers, the thickness of the protection layer 212 may be varied according to the operating power of the transducer 200 so as to avoid caviation in the high intensity zone of the acoustic beams. It will be appreciated that a protection layer 212 is not necessarily essential, but may enhance the performance of the transducer for particular operating conditions.

As mentioned, the width and opening of the acoustic aperture 210 defines the FOV or angle of coverage of the far-field swath beam projected by the acoustic transducer 200, in the plane perpendicular to the longitudinal axis of the transducer (FIG. 3A). It will be appreciated that the number of active acoustic elements 204 in the array may be varied according to the diameter of the concave cylindrical radiation surface required for any particular application and operating frequencies.

The width or focus of the far-field swath beam or sonic beam projected by the acoustic transducer 200, in the plane comprising the longitudinal axis of the transducer (FIG. 3B), is dependent on the overall length of the radiation surface 206 provided by the elongate active acoustic elements 204 as generally indicated by arrows 214. In particular, a longer transducer produces a narrower width swath beam in the direction perpendicular to the FOV, and vice versa for a smaller length transducer.

In summary, it will be appreciated that the length of the active acoustic elements 204 and dimension of the acoustic aperture associated with the radiation surface 206 can be modified or configured to project a specific far-field swath beam having a predetermined FOV and width for a particular operating frequency.

In the first preferred form, each active acoustic element 204 in the array may be any form of operable acoustic transducer element. The active acoustic elements 204 are preferably identical in shape and size, although this is not necessary in alternative forms of the transducer. By way of example, each active acoustic element 204 may be in the form of an elongate continuous structure extending substantially the entire length of the transducer. Each elongate structure may comprise a piece or layer of actively acoustic material, such as an elongate piezoelectric ceramic plate 204a. Each piezoelectric ceramic plate 204a has a front surface 216a directed toward the radiation surface 206 and an opposite rear surface 216b directed toward the bottom of the transducer as shown in FIG. 3A. Optionally, each structure of the active acoustic element 204 may further comprise a matching layer or element 204b provided on the front surface 216a of the piezoelectric ceramic plate 204a to form the effective radiation surface 206. However, it will be appreciated that the active acoustic material of the elements 204 may directly and collectively form the radiation surface 206 with or without one or more matching layers or extensions in alternative forms of the transducer. It will be appreciated that the matching layer 204b of the elements 204 can be formed from any material having a suitable specific acoustic impedance including, by way of example only, polymers, metals, oxides, and composite materials.

Although not shown, each active acoustic element 204 also comprises front and rear electrodes that sandwich the active acoustic material 204a between its front 216a and rear 216b surfaces. Further, electrical connections to the electrodes of each active acoustic element 204 are provided to enable the elements to be driven in an active mode to generate acoustic waves or beams, or alternatively for receiving electrical signals in response to excitation of the active acoustic material by received acoustic waves or beams incident on the radiation surface 206 in a passive mode. In the first preferred form, the centre-to-centre distance between adjacent active acoustic elements 204 should preferably not exceed about one half of the wavelength of the operating frequency.

As will be appreciated, the acoustic transducer 200 may further comprise a control system that is electrically connected to the electrodes of each of the active acoustic elements 204. The control system has electronic circuits that are operable to generate drive signals for applying to the electrodes of the active acoustic elements 204 to thereby cause each element to generate and project an acoustic wave or beam at the desired operating frequency for known acoustic applications. Additionally or alternatively, the control system can be arranged to receive electrical signals generated by the active acoustic elements 204 in response to receiving acoustic beams on the radiation surface 206 and these can be processed in accordance with the known acoustic transducer techniques for various acoustic applications.

In an alternative form, it will be appreciated that the active acoustic elements may be magnetostrictive elements or any other type of operable acoustic transducer element for generating and/or receiving acoustic beams.

In operation of the first preferred form transducer 200, the concave array of elongate active acoustic elements 204 are driven by the control system, via driving signals that are applied to the electrodes of the elements, to generate individual acoustic beams and which produce a swath beam that is a superposition of all of the individual acoustic beams. More specifically, the active acoustic elements 204 that conform to the concave cylindrical radiation surface are excited to produce a sonic wave within the cavity 210 by the driving signals. The sonic field produced as a result of the electrical excitation and acoustical interaction between the piezoelectric elements 204 forms a converging cylindrical acoustic wave front. The wave front propagates through the focal zone (at or about the cylinder axis) and then becomes diverging. At a distance much greater than the wavelength and size of the transducer, i.e. in the far-field, the acoustic intensity of the acoustic wave (swath beam) is substantially uniform within a wide angle (or FOV), the width of which depends on cylinder opening as previously mentioned.

In summary, the concave array of active acoustic elements 204 of the transducer 200 provides a small aperture for generating high power swath beams that have a wide FOV and a substantially uniform response over the FOV.

Second Preferred Form—Multi-Channel Acoustic Transducer

Figures 4A, 4B:
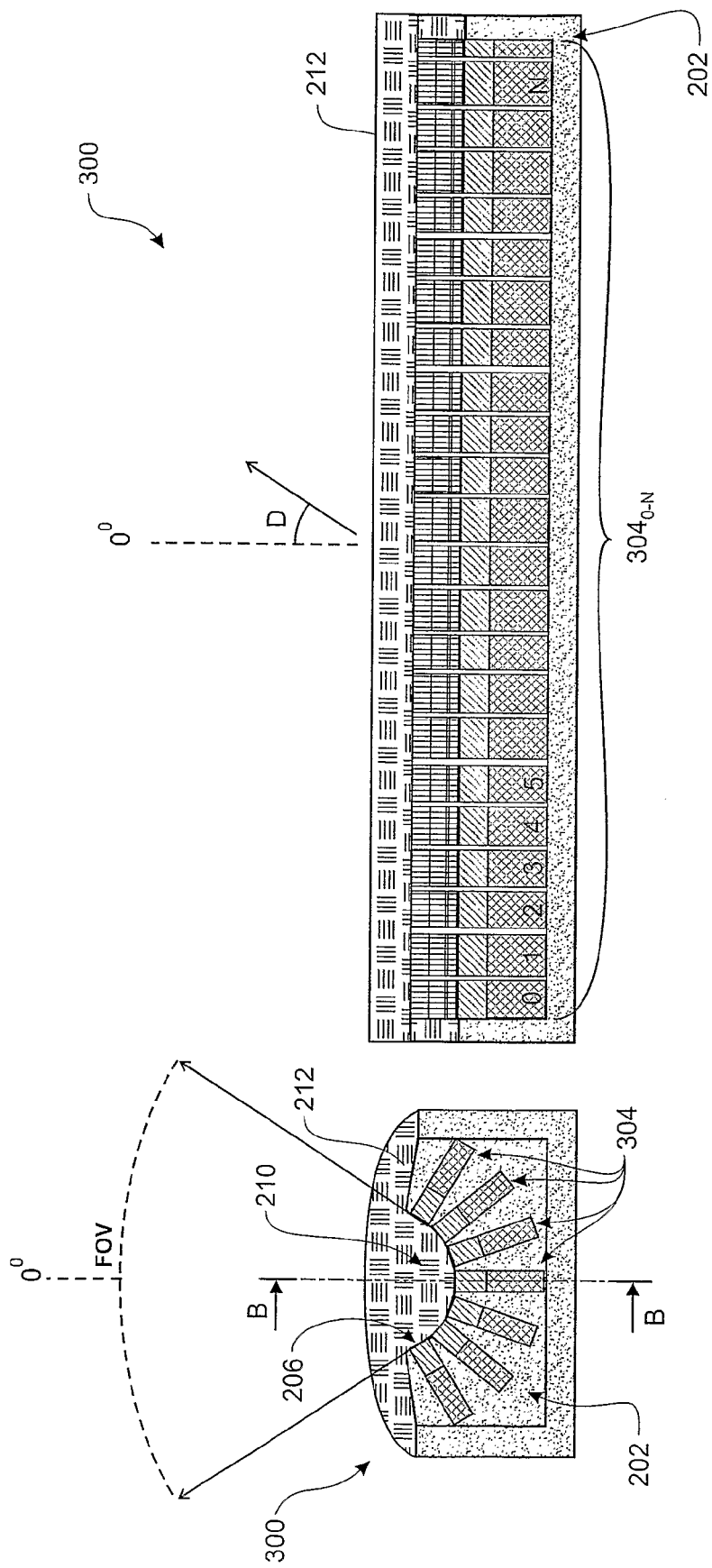
FIG. 4A shows a cross-sectional end view of a second preferred form acoustic transducer of the invention.
FIG. 4B shows a cross-sectional side view of the second preferred form acoustic transducer viewed through line BB of FIG. 4A.

Referring to FIGS. 4A and 4B, a second preferred form acoustic transducer 300 will be described. The second preferred from acoustic transducer 300 is substantially similar in construction to the first preferred form acoustic transducer 200 and like components have been numbered with like reference numerals. The primary difference is that acoustic transducer 300 is a multi-channel transducer having electronic beam control functionality in the form of beam-steering and variable swath beam width control as will be explained in more detail.

Referring to FIG. 4A, the acoustic transducer 300 comprises an array of operable active acoustic elements 304 extending radially outward from the concave cylindrical elongate radiation surface 206 as before. However, the acoustic transducer 300 does not employ continuous elongate active acoustic elements 304 that extend substantially the length of the transducer like the single-channel acoustic transducer 200. In the multi-channel acoustic transducer 300, a line of multiple (N) active acoustic elements $304_{0-N}$ are provided for each array element orientation about the cylindrical axis of the radiation surface 206. Each line of active acoustic element $304_{0-N}$ are electrically and acoustically isolated from each other along the length of the transducer.

The number of individual acoustic elements $304_{0-N}$ in each line is preferably identical and the lines of individual active acoustic elements are preferably aligned with respect to each other along the length of the transducer to thereby provide a series of concave array segments of active acoustic elements along the length of the transducer. In other words, each line of active acoustic elements $304_{0-N}$ extending along the length of the transducer can be considered to be a radial column of elements (FIG. 4A), and the active elements of each radial column are arranged in N circumferential rows (FIG. 4B) about the concave cylindrical radiation surface 210. Each circumferential row of active acoustic elements $304_{0-N}$ can be considered as a concave array segment.

In the second preferred form, a control system for operating and driving the active acoustic elements $304_{0-N}$ is preferably provided. The control system of the acoustic transducer 300 can be operated to activate or deactivate any of the N concave array segments to thereby control the effective length of the radiation surface 206 and thereby the width of the swath beam in the direction of the longitudinal axis on the transducer (FIG. 4B). For example, the control system can be arranged or configured to deactivate one or more of the N concave array segments at one or both ends to thereby reduce the effective length of radiation surface 206 and thereby widen the width of the swath beam projected.

Additionally or alternatively, the control system can be arranged to employ phased-array techniques to apply differently phased driving signals across the concave array segments in order to beam-steer the swath beam or enlarge beam width in the direction of the transducer longitudinal axis. For example, when uniform phase is applied across all the active concave array segments, the far-field swath beam propagates from the radiation surface 206 at an angle substantially perpendicular to the central longitudinal axis of the transducer 300 as shown by the arrow nominated with 0°. However, differential phase driving signals can be applied across the activate concave array segments along the length of the transducer to thereby alter the angle (D) of propagation of the swath beam about an axis that is transverse to the transducer longitudinal axis or enlarge beam width in the direction of the transducer longitudinal axis.

In summary, the multi-channel acoustic transducer 300 provides for the generation of steerable and variable width acoustic swath beams.

Figure 5A:
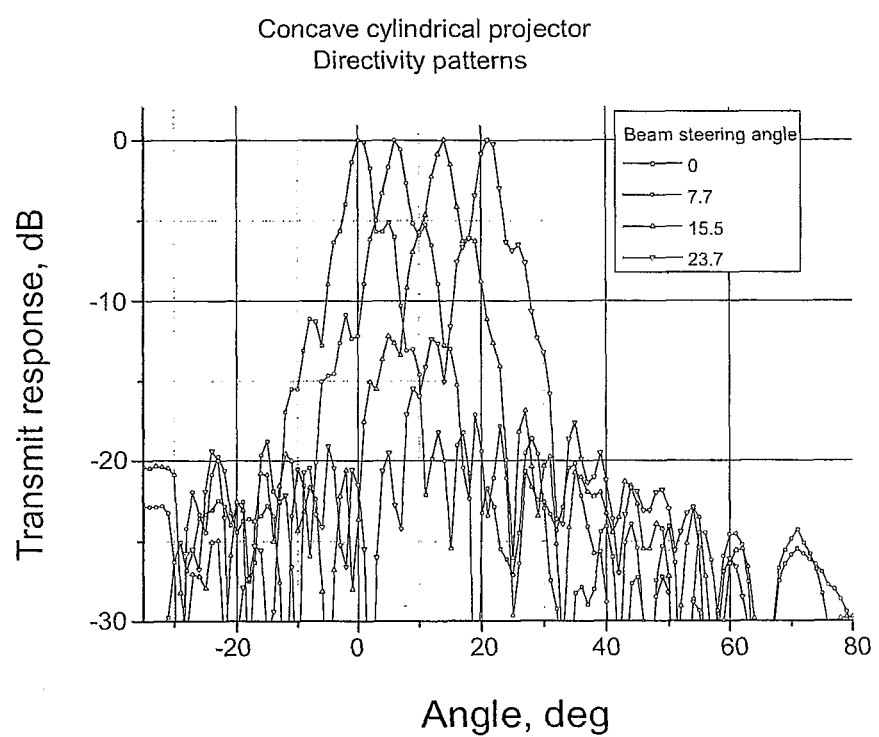
FIG. 5A is a graph of the far-field directivity pattern of an acoustic swath beam projected from the second preferred form acoustic transducer of FIGS. 4A and 4B operating at a frequency of 160 kHz for various beam steering angles in a plane comprising the longitudinal axis of the transducer.
Figure 5B:
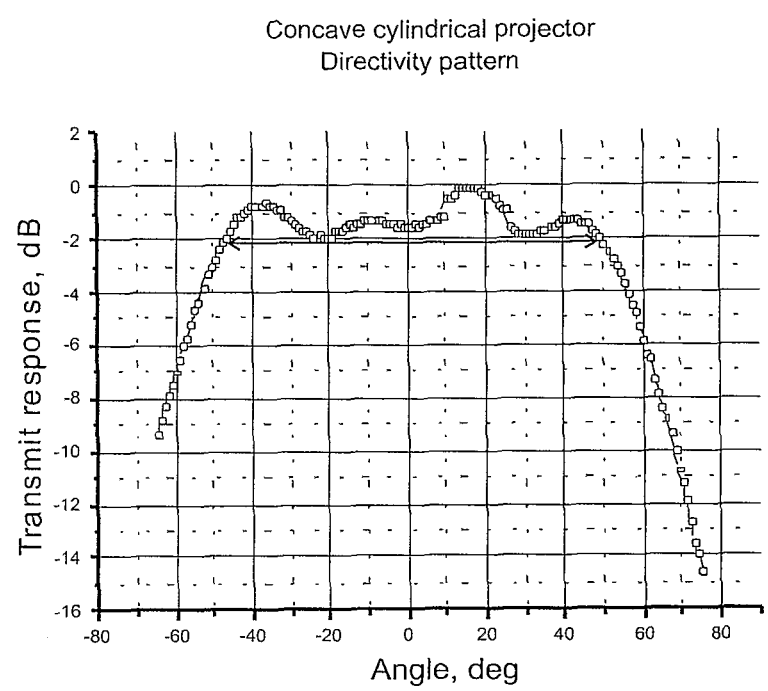
FIG. 5B is a graph of the far-field directivity pattern of an acoustic swath beam projected from the second preferred form acoustic transducer of FIGS. 4A and 4B operating at a frequency of 160 kHz in the plane perpendicular to the longitudinal axis of the transducer.

FIG. 5A shows a far-field directivity pattern of a swath beam projected by an acoustic transducer 300 at an operating frequency of 160 kHz for steering angles D=0°, 7.7°, 15.5°, and 23.7°. The directivity patterns represent the acoustic response of the swath beam in a plane comprising the longitudinal or cylindrical axis of the transducer (FIG. 4B). FIG. 5B shows the far-field directivity pattern of a swath beam projected by acoustic transducer 300 at an operating frequency of 160 kHz in the plane perpendicular to the longitudinal or cylindrical axis of the transducer, or more particularly shows the FOV with reference to FIG. 4A. As shown in FIG. 5B, the swath beam has a substantially uniform response for a wide-angle of approximately 100° in this example. It will be appreciated that the wide-angle uniform response or FOV may be narrowed or widened according to requirements.

Alternative Forms

It will be appreciated that the concave elongate radiation surface of the acoustic transducer of the invention may alternatively be formed by other array arrangements and configurations of active acoustic elements that conform to a concave or preferably cylindrical concave radiation surface. It will be appreciated that the active acoustic elements should preferably collectively form a continuous or substantially continuous radiation surface. However, the acoustic transducer may still operate with spacings between the front surfaces of the array of active elements that form the collective radiation surface, although this may not be the optimum design for certain applications.

Example Applications

The acoustic transducer of the invention is preferably arranged to generate and/or receive high power swath beams via a small aperture. This type of acoustic transducer can be employed in sonar or any other underwater acoustic devices or applications. In addition, the acoustic transducer can also operate in any acoustic medium including water or air. For example, the acoustic transducer can be employed as a wide-angle acoustic transducer for air acoustics in audio applications.

It will be appreciated that two or more transducers may be coupled together in a side-by-side linear or curved arrangement with each producing its own swath beam and thereby providing an overall wider field of view with an omni-directional transducer being the extreme example. For example, multiple coupled transducers may be useful for underwater side scanning applications.

The foregoing description of the invention includes preferred forms thereof. Modifications may be made thereto without departing from the scope of the invention as defined by the accompanying claims.

The invention claimed is:

1. An underwater swath beam acoustic transducer for projecting and receiving far-field acoustic swath beams through water, comprising:
    an elongate support structure defining a longitudinal axis of the transducer;
    an array of active acoustic elements, supported by the elongate support structure, that are arranged to collectively provide an elongate concave radiation surface with an associated acoustic aperture that extends in the direction of the longitudinal axis of the transducer such that the radiation surface has a concave cross-sectional profile along the longitudinal axis of the transducer, and each active acoustic element being operable to project an individual acoustic beam from the radiation surface toward a near-field focal zone of the transducer; and
    a control system that is electrically connected to the active acoustic elements and which is configured to generate electrical driving signals to drive each of the active acoustic elements so as to project far-field acoustic swath beams through water beyond the acoustic aperture of the transducer, the far-field acoustic swath beams each being a superposition of all of the individual acoustic beams such that in the far-field, beyond the focal zone and acoustic aperture of the transducer, the acoustic swath beams have a wide field of view in a plane that is transverse to the longitudinal axis of the transducer, a narrow width in the direction of the longitudinal axis of the transducer, and an acoustic intensity that is substantially uniform across the field of view, and
    wherein the control system is further configured to receive and process electrical signals from the active acoustic elements that are generated in response to swath beams incident upon the radiation surface that are reflected back to the transducer from the far-field beyond the focal zone and acoustic aperture of the transducer.

2. An underwater swath beam acoustic transducer according to claim 1 wherein the radiation surface is a concave semicylindrical radiation surface in that the radiation surface conforms substantially to the peripheral external surface of a semicylinder.

3. An underwater swath beam acoustic transducer according to claim 2 wherein the active acoustic elements are arranged about the concave semicylindrical radiation surface with each element being equally spaced relative to each other about the radiation surface.

4. An underwater swath beam acoustic transducer according to claim 3 wherein the array of active acoustic elements is arranged to provide a substantially continuous radiation surface.

5. An underwater swath beam acoustic transducer according to claim 1 wherein each active acoustic element is an acoustic transducer element comprising active acoustic material coupled between electrodes that are electrically excitable.

6. An underwater swath beam acoustic transducer according to claim 5 wherein each acoustic element is provided with one or more matching layers coupled directly or indirectly to the active acoustic material, the matching layer(s) being arranged to provide an impedance matching between the transducer and the water through which the acoustic beams propagate.

7. An underwater swath beam acoustic transducer according to claim 6 wherein each active acoustic element comprises a matching layer situated between the radiation surface and the active acoustic material.

8. An underwater swath beam acoustic transducer according to claim 1 wherein the active acoustic elements are acoustically isolated from each other within a support structure.

9. An underwater swath beam acoustic transducer according to claim 1 wherein each active acoustic element in the array is straight and elongate.

10. An underwater swath beam acoustic transducer according to claim 9 wherein the length of each active acoustic element extends substantially the entire length of the radiation surface.

11. An underwater swath beam acoustic transducer according to claim 10 wherein the transducer is arranged to produce a swath beam having a substantially fixed width in the direction of the longitudinal axis of the radiation surface.

12. An underwater swath beam acoustic transducer according to claim 10 wherein each straight and elongate active acoustic element is collectively formed from a line of multiple individual active acoustic elements that are acoustically and electrically isolated from each other along the length of the transducer.

13. An underwater swath beam acoustic transducer according to claim 12 wherein the lines of individual active acoustic elements are aligned with respect to each other along the length of the transducer to thereby provide a series of selectively operable concave array segments of active acoustic elements along the length of the transducer.

14. An underwater swath beam acoustic transducer according to claim 13 wherein the control system is operable to activate or deactivate any one or more of the concave array segments of active acoustic elements to thereby control the effective length of the radiation surface and consequently the width of the propagated swath beam in the direction of the longitudinal axis of the radiation surface.

15. An underwater swath beam acoustic transducer according to claim 13 wherein the control system is operable to apply differently phased driving signals to the concave array segments of active acoustic elements to thereby steer the propagated swath beam in the desired direction about an axis transverse to the longitudinal axis of the radiation surface.

16. An underwater swath beam acoustic transducer according to claim 1 wherein the active acoustic elements are driven by the control system at a predetermined operating frequency and the array of active acoustic elements are arranged such that the centre-to-centre distance between adjacent acoustic elements about the radiation surface is not greater than approximately one half of the wavelength of the operating frequency.

17. An underwater swath beam acoustic transducer according to claim 1 wherein the radiation surface is indirectly exposed via one or more protection layers to the acoustic medium through which the projected or received acoustic swath beams propagate.

18. An underwater swath beam acoustic transducer according to claim 17 wherein the radiation surface forms the acoustic aperture through which acoustic swath beams are projected or received, the one or more protection layers being arranged to at least partially fill the acoustic aperture.

19. An underwater swath beam acoustic transducer according to claim 18 wherein at least one of the protection layers is formed from rubber that is formulated to be acoustically transparent in the water to enable the transducer to operate underwater.

20. A method of projecting and receiving far-field acoustic swath beams through water comprising:
exposing an underwater swath beam acoustic transducer to the water, the underwater swath beam acoustic transducer comprising:
an elongate support structure defining a longitudinal axis of the transducer,
an array of active acoustic elements, supported by the support structure, that are arranged to collectively provide an elongate concave radiation surface with an associated acoustic aperture that extends in the direction of the longitudinal axis of the transducer such that the radiation surface has a concave cross-sectional profile along the longitudinal axis of the transducer, and each active acoustic element being operable to project an individual acoustic beam from the radiation surface toward a near-field focal zone of the transducer, and
a control system that is electrically connected to the active acoustic elements and which is configured to generate electrical driving signals to drive each of the active acoustic elements so as to project far-field acoustic swath beams through water beyond the acoustic aperture of the transducer;
driving, via the control system, the array of active acoustic elements of the transducer to project far-field acoustic swath beams through the water, the swath beams each being a superposition of all of the individual acoustic beams from the acoustic elements of the transducer such that in the far-field, beyond the focal zone and acoustic aperture of the transducer, the acoustic swath beams have a wide field of view in a plane that is transverse to the longitudinal axis of the transducer, a narrow width in the direction of the longitudinal axis of the transducer, and an acoustic intensity that is substantially uniform across the field of view; and
receiving and processing, via the control system, electrical signals from the active acoustic elements that are generated in response to swath beams incident upon the radiation surface that are reflected back to the transducer from the far-field beyond the focal zone and acoustic aperture of the transducer.

21. A method of projecting acoustic swath beams through water according to claim 20 wherein the transducer is formed by a series of selectively operable concave array segments of active acoustic elements along the length of the transducer.

22. A method of projecting acoustic swath beams through water according to claim 21 further comprising the step of driving a selected number of adjacent concave array segments to thereby control the effective length of the radiation surface and consequently the width of the propagated swath beam in the direction of the longitudinal axis of the radiation surface.

23. A method of projecting acoustic swath beams through water according to claim 21 further comprising steering the propagated swath beam in the desired direction about an axis transverse to the longitudinal axis of the radiation surface by applying differently phased driving signals to the concave array segments.

* * * * *